US010846798B2

(12) United States Patent
Multer et al.

(10) Patent No.: US 10,846,798 B2
(45) Date of Patent: Nov. 24, 2020

(54) METHODS AND SYSTEMS FOR PROVIDING LIQUIDITY OPTIONS AND PERMANENT LEGACY BENEFITS FOR ANNUITIES

(71) Applicant: New York Life Insurance Company, New York, NY (US)

(72) Inventors: Corey Blaine Multer, Merrick, NY (US); Robert L. Conway, Babylon, NY (US); David John Baelis, Edison, NJ (US)

(73) Assignee: New York Life Insurance Company, New York, NY (US)

( * ) Notice: Subject to any disclaimer, the term of this patent is extended or adjusted under 35 U.S.C. 154(b) by 430 days.

(21) Appl. No.: 13/964,946

(22) Filed: Aug. 12, 2013

(65) Prior Publication Data

US 2014/0046702 A1 Feb. 13, 2014

Related U.S. Application Data

(63) Continuation of application No. 10/414,690, filed on Apr. 16, 2003, now Pat. No. 8,533,080.

(51) Int. Cl.
*G06Q 40/08* (2012.01)
*G06Q 40/00* (2012.01)
(Continued)

(52) U.S. Cl.
CPC ............ *G06Q 40/08* (2013.01); *G06Q 40/00* (2013.01); *G06Q 40/06* (2013.01); *G06Q 20/10* (2013.01); *G06Q 20/102* (2013.01); *G06Q 40/02* (2013.01)

(58) Field of Classification Search
CPC ........ G06Q 40/00; G06Q 40/06; G06Q 40/04; G06Q 40/02; G06Q 20/10; G06Q 20/102;
(Continued)

(56) References Cited

U.S. PATENT DOCUMENTS 3,634,669 A 1/1972 Soumas et al.
4,566,066 A 1/1986 Towers
(Continued)

FOREIGN PATENT DOCUMENTS

JP 10228509 8/1998
WO 2001050306 7/2001
(Continued)

OTHER PUBLICATIONS

"Annuity Basis-The Possibilities of Annuities" p. 1-2 at http://www.retireonyourterms.com/annuities/a_possibl.asp. 1999.
(Continued)

*Primary Examiner* — Behrang Badii
(74) *Attorney, Agent, or Firm* — McDermott Will & Emery LLP

(57) ABSTRACT

This invention relates to methods and systems that provide annuities with at least one liquidity option that allows the holder of the liquidity option to exercise the option and convert therewith a portion of a value of the annuity into a liquid asset, such as cash or a cash value, based on the value of future income payments, which can include payments that are guaranteed to be paid for the duration of one or more lifetime. The conversion may be in a variety of forms, such as an advance of at least a portion of the future income payments, or in the form a lump sum distribution of at least a portion of a commuted value of the annuity computed based at least in part on the present value, at the time of the conversion, of future income payments for the remainder of the guarantee period. This invention further relates to methods and systems that provide annuities including a liquid legacy benefit option that provide a lump sum distribution of a portion of an annuity premium to a beneficiary at the end of the guarantee period that is substantially certain at the inception of the annuity.

18 Claims, 3 Drawing Sheets

(51) Int. Cl.
*G06Q 40/06* (2012.01)
*G06Q 40/02* (2012.01)
*G06Q 20/10* (2012.01)

(58) Field of Classification Search
CPC .... G06Q 30/02; G06Q 20/387; G06Q 40/025; G06Q 40/08; G06Q 30/0279; G06Q 30/0219; G06Q 30/0234; G06Q 30/0236; G06Q 30/0241; G06Q 30/0235; G06Q 40/10; G06Q 50/24; G06Q 50/22; G07G 1/145; G06F 19/3418; G06F 19/3456; G06F 19/328; G16H 10/60
USPC .................. 705/36 R, 36 T, 35, 40, 38
See application file for complete search history.

(56) References Cited

U.S. PATENT DOCUMENTS

| | | |
|---|---|---|
| 4,722,055 A | 1/1988 | Roberts |
| 4,750,121 A | 6/1988 | Halley et al. |
| 4,989,141 A | 1/1991 | Lyons et al. |
| 5,132,899 A | 7/1992 | Fox |
| 5,185,696 A | 2/1993 | Yoshino et al. |
| 5,231,571 A | 7/1993 | D'Agostino |
| 5,479,344 A | 12/1995 | Keziah, Jr. |
| 5,502,637 A | 3/1996 | Beaulieu et al. |
| 5,523,942 A | 6/1996 | Tyler et al. |
| 5,590,037 A | 12/1996 | Ryan et al. |
| 5,689,649 A | 11/1997 | Altman et al. |
| 5,712,984 A | 1/1998 | Hammond et al. |
| 5,752,236 A | 5/1998 | Sexton et al. |
| 5,754,980 A | 5/1998 | Anderson et al. |
| 5,761,645 A | 6/1998 | Hawkins |
| 5,784,696 A | 7/1998 | Melnikoff |
| 5,799,287 A | 8/1998 | Dembo |
| 5,806,047 A | 9/1998 | Hackel et al. |
| 5,812,987 A | 9/1998 | Luskin et al. |
| 5,819,230 A | 10/1998 | Christie et al. |
| 5,864,828 A | 1/1999 | Atkins |
| 5,893,071 A | 4/1999 | Cooperstein |
| 5,918,217 A | 6/1999 | Maggioncalda et al. |
| 5,926,792 A | 7/1999 | Koppes et al. |
| 5,933,815 A * | 8/1999 | Golden .............. G06Q 20/102 705/36 R |
| 5,956,691 A | 9/1999 | Powers |
| 5,978,778 A | 11/1999 | O'Shaughnessy |
| 5,991,733 A | 11/1999 | Aleia et al. |
| 5,991,740 A | 11/1999 | Messer |
| 5,999,929 A | 12/1999 | Goodman |
| 6,012,043 A | 1/2000 | Albright et al. |
| 6,012,044 A | 1/2000 | Maggioncalda et al. |
| 6,014,632 A | 1/2000 | Gamble et al. |
| 6,021,397 A | 2/2000 | Jones et al. |
| 6,026,364 A | 2/2000 | Whitworth |
| 6,055,517 A | 4/2000 | Friend et al. |
| 6,064,969 A | 5/2000 | Haskins |
| 6,275,807 B1 | 8/2001 | Schirripa |
| 6,343,272 B1 | 1/2002 | Payne et al. |
| 6,567,790 B1 * | 5/2003 | Slane .............. G06Q 40/00 705/35 |
| 6,801,199 B1 | 10/2004 | Wallman |
| 7,016,871 B1 | 3/2006 | Fischer et al. |
| 7,080,032 B2 | 7/2006 | Abbs et al. |
| 7,089,201 B1 | 8/2006 | Dellinger et al. |
| 7,120,601 B2 | 10/2006 | Chen |
| 7,251,623 B1 | 7/2007 | Ryan et al. |
| 7,562,040 B2 | 7/2009 | Loeper |
| 7,664,700 B1 * | 2/2010 | Fisher, III ............ G06Q 20/10 705/35 |
| 7,778,907 B1 * | 8/2010 | Haskins ............ G06Q 40/00 705/35 |
| 2002/0082965 A1 | 6/2002 | Loeper |
| 2002/0087365 A1 * | 7/2002 | Kavanaugh .......... G06Q 20/10 705/4 |
| 2002/0103679 A1 | 8/2002 | Burkhalter et al. |
| 2002/0169715 A1 | 11/2002 | Ruth et al. |
| 2002/0184129 A1 * | 12/2002 | Arena .............. G06Q 40/00 705/35 |
| 2002/0188540 A1 | 12/2002 | Fay et al. |
| 2002/0198802 A1 * | 12/2002 | Koresko ............ G06Q 40/00 705/35 |
| 2003/0004844 A1 | 1/2003 | Hueler |
| 2003/0028466 A1 | 2/2003 | Jenson et al. |
| 2003/0083972 A1 * | 5/2003 | Williams ............ G06Q 40/04 705/36 R |
| 2003/0088430 A1 | 5/2003 | Ruark |
| 2003/0088444 A1 | 5/2003 | Garbin et al. |
| 2003/0105690 A1 * | 6/2003 | Brown ............... G06Q 30/02 705/35 |
| 2003/0110061 A1 | 6/2003 | Lakenbach et al. |
| 2003/0126053 A1 | 7/2003 | Boswell et al. |
| 2003/0144888 A1 | 7/2003 | Baron et al. |
| 2003/0167202 A1 | 9/2003 | Marks et al. |
| 2004/0122770 A1 | 6/2004 | Craig et al. |
| 2004/0158517 A1 | 8/2004 | Mahaney et al. |
| 2004/0172350 A1 | 9/2004 | Atkinson et al. |
| 2005/0060251 A1 | 3/2005 | Schwartz et al. |
| 2005/0187801 A1 | 8/2005 | Phelps |
| 2005/0234821 A1 | 10/2005 | Benham et al. |
| 2006/0212380 A1 * | 9/2006 | Williams ............ G06Q 40/00 705/35 |
| 2007/0011086 A1 * | 1/2007 | Dellinger ............ G06Q 20/102 705/38 |
| 2007/0143199 A1 | 6/2007 | Stiff et al. |
| 2007/0156588 A1 | 7/2007 | Howell et al. |
| 2007/0168235 A1 | 7/2007 | Livingston |
| 2008/0052230 A1 | 2/2008 | Crane et al. |
| 2008/0109264 A1 * | 5/2008 | Menke ............... G06Q 20/10 705/4 |
| 2008/0270323 A1 * | 10/2008 | Arena .............. G06Q 40/00 705/36 R |
| 2008/0294569 A1 | 11/2008 | Dever |
| 2009/0037231 A1 * | 2/2009 | Menke ............... G06Q 20/10 705/4 |
| 2009/0150301 A1 | 6/2009 | Abbott et al. |
| 2009/0204538 A1 | 8/2009 | Ley et al. |
| 2009/0307016 A1 | 12/2009 | Gray et al. |

FOREIGN PATENT DOCUMENTS

| | | |
|---|---|---|
| WO | 2001069504 | 9/2001 |
| WO | 200175742 | 10/2001 |
| WO | 2001075557 | 10/2001 |
| WO | 2002013118 | 2/2002 |
| WO | 2002015457 | 2/2002 |
| WO | 2002035363 | 5/2002 |
| WO | 2003012594 | 2/2003 |
| WO | 2003058378 | 7/2003 |
| WO | 2004013794 | 2/2004 |

OTHER PUBLICATIONS

"Double the Benefit With a Split Annuity" by John E. Tregarthen: Pub: Life Association News, Sep. 1997, vol. 92, No. 9, ABII/INFORM Global, p. 124, 126.

"Market Mix" Anonymous, National Underwriter, vol. 103, No. 40, p. 33-36, Published Oct. 4, 1999, ISSN: 0893-8202; Dialog ID No. 01909576.

IV How Fixed, Variable, and Index Annuity Contract Provisions Affect Consumers, Sep. 2004, best Insurance Education, p. 1 (Can be found at http://www.bested.com/studyguides/caannuitytraining/Annuity%20Training%20Sec%202.pdf).

MultiOption Variable Annuities: Helping you accumulate the dollars you need for a financially secure retirement Minnesota Life at web.archive.org/web/*/http://www/minnesotalife.com, Jul. 2002, pp. 1-2.

National Association of Insurance Commissioners, "Buyers Guide to Fixed Deferred Annuities with Appendix for Equity Indexed Annuities", 1999.

(56) References Cited

OTHER PUBLICATIONS

Financial Planning: Annuity Ladders, Dave Lindhoff (Jun. 11, 2009) pp. 1-3.
Banks Seen jumping to Unified Managed Account, (Jan. 20, 2010)Britannica Online Encyclopedia, http:www.britannica.com/bps/additionalcontenU18/22539482/Banks-Seen-Jumping_Dire., pp. 1-7.
Vistech.com,"A Case Study in innovation: CoDI Enterprise Suite Speeds to Market" (2008) Visual Technologies Inc., 2 pages.
Vistech.com, "cEPS Administration Systems:" Positioning for the next generation of products (2008), Visual Technologies Inc., 2 pages.
Vistech.com, "cEPS/ol: Overlay System", (2008) Visual Technologies Inc., 2 pages.
Peng Chen, et al. (2003) Journal of Financial Planning, Merging Asset Allocation and Longevity Insurance: An Optimal Perspective on Payout Annuities, pp. 64-72.
Mesirow Financial Retirement Income Solution: Investment Strategies, 2 pages. 2010.
Jeff Benjamin (Jun. 2, 2008) Investment News: New Annuity-wrapped managed account sparks interest, confusion, http://www.investmentnews.com/article/20080602/RE G/712510394, pp. 1-4.
Alan Levine (Aug. 18, 2009) Registered Rep: New product Pays Guaranteed Income of Managed Accounts, http://www.registeredrep.com/newsletters/insuranceletter/new_ product_guaranteed_income_man., pp. 1-4.
PNC Financial Services Group MediaRooM-News Releases, PFPC Launches Unified Managed Account Platform, http://pnc.mediroom_c om/index.php?s=43&item=232&printable, pp. 1-2, 2002.
Symetra Financial, Spinnaker Advisor Variable Annuity (May 2008) Fact Sheet, 2 pages.
Anonymous. "A Shopper's Guide to Long-Term Care Insurance," National Association of Insurance Commissioners, 1999, 45 pages.
Black, Kenneth Jr. And Harold D. Skipper, Jr. Life Insurance 1ih Ed., Englewood Cliffs, NJ, Prentice-Hall, Inc. 1994, Chapters 7, 10 and 13.
Brown, Bruce. "KSH-2 Financial Calculator 1.6," PC Week, vol. 8, No. 31, Aug. 5, 1991, p. 78.
Desimone, Marcella. "Early Enrollment Period Begins for Federal LTCI Program," National Underwriter, Apr. 1, 2002, vol. 106, No. 13, p. 40.
English, David. "Get Rich Quick," Comput, vol. 16, No. 98, Sep. 1994, p. 38.
Feldman, Saul. "Wealthbuilder 2.0," Macworld, vol. 10, No. 5, May 1993, p. 146.
Granza et al. "Financing Long-Term Care: Employee Needs-and Attitudes, and the Employer's Role," International Society of Certified Employee Benefits Specials 1998 Benetits Quarterly, vol. 14, No. 4, pp. 60-72.
Iglehart, Mark. "Don't Gamble when Planning for Long-Term Care," The National Public Accountant, Apr. 2001, vol. 46, No. 2, p. 11, 2 pgs.
Iverson, Wesley. "From Desktop to the Web," Financial Service Online, Mar. 1999, p. 42+.
Journal of Commerce, "Life Before Death," Jun. 19, 1990, 2 pgs.
Kerry, Mark E. "Whole Life & an LTC Rider: One Solution to the Long-Term Care Dilemma," Life Association News, vol. 86, No. 7, Jul. 1991, pp. 71-75.
Poglianich, Antonio. "Life Care Communities: Evaluating a Promising Retirement Alternative," Journal of the Institute of Certified Financial Planners, vol. 9, No. 1, Spring 1988, pp. 29-34.
Pullman, Liz. "Personal Finance: CPAs Compute Pluses, Minuses of New Law Allowing Commissions," Los Angeles Times, Nov. 21, 1998.
Shipley, Chris. "12 Best Financial-Software Packages," Working Woman, vol. 18, No. 2, Feb. 193, pp. 42-43.
TIAA-CREF Web Center. "Optional Long-Term Care Benefits," http://web.archive.org/web/20020210171521/http://www.tiaa-cref.org . . . , retrieved Apr. 7, 2005.
Nare, Robert C. "Medicare and Medicaid," Life and Health Insurance Sales, vol. 135, No. 11, Nov. 1992, pp. 28-30.
"Choosing the right form of settlement" by Brown, Nicholas D; Nixon, David L: The Practical Litigator Philadelphia; Sep. 1993, vol. 4, Iss 5; p. 63.

\* cited by examiner

METHODS AND SYSTEMS FOR PROVIDING LIQUIDITY OPTIONS AND PERMANENT LEGACY BENEFITS FOR ANNUITIES

CROSS-REFERENCE TO RELATED APPLICATIONS

The present application claims the benefit of priority under 35 U.S.C. § 120 as a continuation from U.S. patent application Ser. No. 10/414,690, entitled "METHODS AND SYSTEMS FOR PROVIDING LIQUIDITY OPTIONS AND PERMANENT LEGACY BENEFITS FOR ANNUITIES," filed on Apr. 16, 2003 and issued on Sep. 10, 2013 under U.S. Pat. No. 8,533,080, the disclosure of which is hereby incorporated by reference in its entirety for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

This invention relates generally to methods and systems for providing annuities with liquidity options and permanent legacy benefits. More particularly, the methods and systems of the present invention provide a policy owner with options that when elected or exercised allow the owner, which may or may not be the annuitant, or, in the case of the legacy benefit, the beneficiary to convert some or all of an annuity into a liquid asset, such as cash. Liquidity is used herein to generally denote enabling an individual to convert a portion or all of the value of a contract into a liquid asset. Legacy Benefit is used herein to generally denote a cash benefit payable to the policy owner's beneficiary or beneficiaries in the event of the annuitant's (or both annuitants') death.

Annuities are generally contracts that provide individuals with means to accumulate money and/or turn accumulated money into future income payments, for a predefined period of time, computed based on the life expectancy of one or more annuitants. The income payments may be guaranteed for the life or lives of the annuitants and/or for a term certain, such as 5, 10, 15, or 20 years. Annuities are typically purchased from insurance companies that offer a variety of options with regard to the manner in which the income payments are disbursed. Immediate annuities, for example, provide income payments that generally begin immediately or within one year of the contract date. Alternatively, deferred annuities, as the name applies, provide income payments beginning at a later date, such as at the date the owner selects as the annuitant's retirement date.

Although annuities are often a prudent investment strategy for many individuals due, for instance, to the lifetime payment guarantee and certain tax and spendthrift advantages above alternative investments, the lack of or limited liquidity associated with annuities during the payout phase may result in potential annuitants passing up annuities as an investment option. Currently, liquidity options appearing in annuities in the art typically include restrictions or limitations that either prevent or dissuade the annuitant from exercising the options to convert the annuity or a portion thereof into cash except in certain predefined and typically extenuating circumstances. For example, certain annuities include liquidity options in the form of accelerated benefits that allow annuitants diagnosed with a critical illness to elect to accelerate income payment in order to receive a lump sum benefit in lieu of future payments. Such accelerated benefits, however, do not provide liquidity for annuitants in other than life threatening circumstances and thus provide no measure of relief for annuitants that may need money for less extenuating circumstances.

Additionally, certain annuities provide liquidity by allowing annuitants to withdraw all or part of an amount of an applicable guaranteed minimum payment duration or total of payments, such as up to the paid premium or a portion thereof. However, since the amount of the withdrawal is generally limited to the value of the predetermined minimum payment duration or total, owners may find there is little remaining value to benefit from a withdrawal at precisely the time when their need for liquidity is more likely to arise.

Annuities further fail to provide adequate legacy benefits to beneficiaries after the annuitants die. An annuity purchaser has a variety of options regarding payments to beneficiaries. For example, periodic income payments to a selected beneficiary may commence after the annuitant of a single life-annuity dies. Alternatively, a lump sum distribution may be paid. Since, however, the payment or payments to the beneficiaries are typically based on a predetermined minimum payment duration or total, such as the amount of the paid premium or purchase price, and since the benefit to the beneficiaries is only the value remaining after any disbursements to the annuitant, the distribution to the beneficiary is not certain at least at the inception of the annuity. Annuitants interested in providing a lump sum legacy benefit to a beneficiary that is substantially certain at least at the inception of the annuity without resort to a separate life insurance policy may therefore also shy away from annuities as an investment option.

There is therefore a need for methods and systems for providing annuities with liquidity options that overcome the shortcomings associated with the liquidity options described above and legacy benefits that overcome the shortcomings associated with the legacy benefits that are currently available. A few computerized systems have been adopted in the art with respect to annuities, such as those described in U.S. Pat. No. 5,893,071, entitled "Annuity Value Software," U.S. Pat. No. 5,933,815, entitled "Computerized Method and System for Providing Guaranteed Lifetime Income with Liquidity," and U.S. Pat. No. 6,064,969, entitled "Flexible Annuity Settlement Proposal System," each of which is hereby incorporated herein by reference. The systems and methods described therein do not, however, address and/or overcome the shortcomings associated with annuity liquidity and legacy benefits.

SUMMARY OF THE INVENTION

This invention relates to methods and systems that provide, among other things, annuities with liquidity options without some or all of the shortcomings associated with annuity liquidity appearing in the art and legacy benefits without some or all of the shortcomings associated with existing annuity legacy benefits.

In one aspect of this invention, a method of providing an annuity having a guarantee period is provided that includes the steps of obtaining information useful for issuing an annuity from an individual, and computing either an annuity premium or future income payments based at least partially on the information obtained from the individual. The annuity includes at least one liquidity option, which allows the holder of the liquidity option to exercise the option and convert therewith a portion of a value of the annuity into a liquid asset. In at least one embodiment, the value of the annuity is computed at least in part based on or taking into account the value of the future income payments. The liquidity option may be limited to being exercised and thereby allowing the holder of the option to convert a portion of the value of the annuity into a liquid asset only after the annuity payments begin and/or for a limited number of times.

The conversion may be in a variety of forms, such as in the form of an advance of at least a portion of the future income payments, or a plurality thereof, such as six months of future income payments. In one embodiment, the liquidity option limits the holder's ability to exercise the option to only twice after the annuity payments begin. To account for the advance of the future income payments, future income payments due to the holder of the liquidity option subsequent to the advance may be ceased for a period of time. For instance, where six months of future income payments are advanced, the future income payments will cease for six months subsequent to the advance. Conceptually, the advance may be viewed as a lump sum distribution of six months worth of future income payments in which instance the advance will be of five future income payments and consequently future income payments will cease for a period of five months to account for the distribution.

In one embodiment, the conversion is in the form a lump sum distribution of at least a portion of a commuted value of the annuity, such as 30% of the commuted value, computed based at least in part on the present value, at the time of the conversion, of future income payments that are expected to be paid, e.g., over the remainder of the annuitant's lifetime or the remainder of the guarantee period. The future income payments may be based on the life of the annuitant or beneficiary, in which instance the lump sum distribution of the commuted value of the annuity or a portion thereof is computed based at least in part on the present value, at the time of the conversion, of the future income payments expected to be paid out over the life of the annuitant. The holder of the liquidity option may further be limited in this respect to exercising the liquidity option for a limited number of times, such as once after the annuity payments begin, or at predefined time intervals after the annuity payments begin, such as at about the fifth, tenth, or fifteenth anniversaries of a commencement date to receive income payments, or upon a showing of an occurrence of a predefined event.

In another aspect of the present invention, a method of providing an annuity is provided that includes the steps of obtaining information useful for issuing an annuity from an individual, and computing future income payments based at least in part on a legacy benefit option which provides a lump sum distribution of a portion of an annuity premium to a beneficiary upon the death of the annuitant or annuitants. The lump sum distribution is substantially certain at the inception of the annuity. The lump sum distribution may be in the form of a percentage of an annuity premium, such as about 25% or about 50%. In one embodiment, the guarantee period of the annuity is based on the life of the individual. The future income payments are therefore computed based on a liquid benefit option, which provides a lump distribution of a portion of the annuity as a death benefit to the beneficiary. In one embodiment, the legacy benefit option provides a lump sum distribution to a beneficiary that does not expire during the term of the annuity.

In another aspect of the present invention, a method of facilitating distribution of annuity payments is provided that includes the steps of receiving a demand for a liquid distribution, and computing the liquid distribution according to at least one liquidity option of an annuity. The liquidity option generally allows the holder of the liquidity option to convert a portion of the value of the annuity into a liquid asset, such as cash. The value of the annuity, in at least one embodiment, is computed at least in part based on future income payments, which can include payments that are guaranteed to be paid for the duration of one or more lifetimes.

In one embodiment, the liquid distribution may be in the form of an advance of at least a portion of future income payments, or a plurality thereof, such as an advance of six months of the future income payments. The distribution may also be a lump sum distribution of six months worth of future income payments. The option may be limited with respect to the number of times it may be exercised, such as twice after the annuity payments begin. The method may further include the steps of making the liquid distribution, and ceasing future income payments due to the holder of the liquidity option subsequent to the advance for a period of time to account for the advance of the future income payments. For instance, where an advance of six months of future income payments are made, the future income payments may cease for six months subsequent to the advance or where the advance is for five future income payments, the future income payments cease for a period of five months to account for the lump sum distribution.

In another embodiment, the liquid distribution is made in the form of a lump sum distribution of at least a portion of the commuted value, such as 30% of the commuted value, of the annuity computed based at least in part on the present value, at the time of the conversion, of future income payments that are guaranteed to be paid, e.g., for the remainder of the guarantee period. The future income payments may be based on the life of the annuitant, in which instance the liquid distribution is at least a portion of the commuted value of the annuity computed based at least in part on the present value, at the time of the conversion, of the future income payments expected to be paid out over the life of the annuitant. The right to exercise the liquidity option may be limited to a certain number of times, such as once after the annuity payments begin, and at predefined time intervals after the annuity payments begin, such as at about the fifth, tenth, and fifteenth anniversaries of the commencement of income payments, or upon a showing of an occurrence of a predefined event.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

The methods and systems according to the present invention may be applied equally to any type of annuity, such as an immediate annuity, a deferred annuity, a fixed rate annuity, a variable annuity, etc. Therefore, although the methods and systems herein will be discussed by way of example in relation to certain types of annuities, it is understood that the present invention is not limited thereto.

Figure 1:
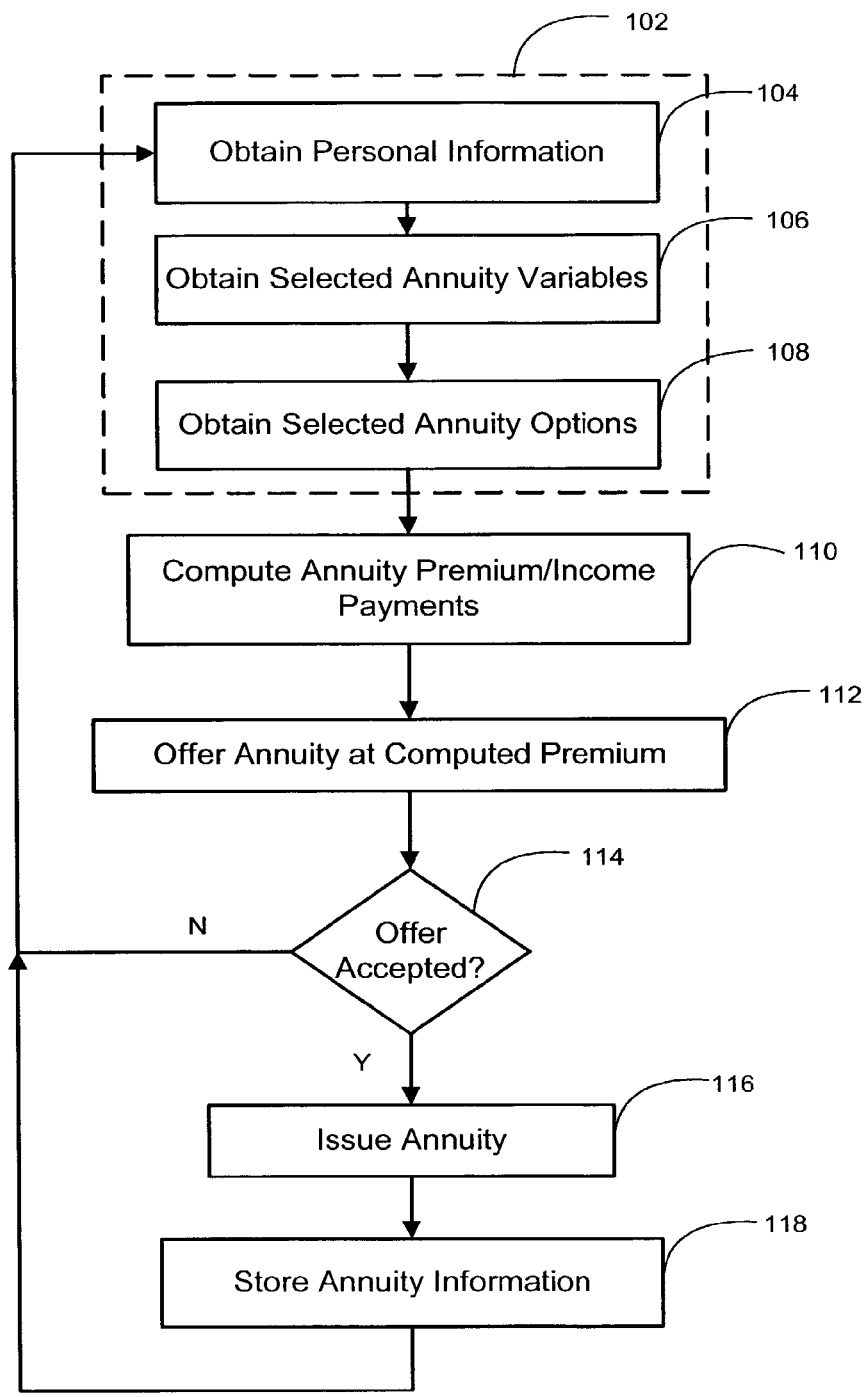
FIG. 1 is a flowchart of a method of providing an annuity which includes at least one liquidity option according to one embodiment of this invention.

Referring to FIG. 1, a method of providing an annuity with at least one liquidity option according to an embodiment of this invention begins at step 102 with obtaining information from an individual or individuals, such as potential annuitants, that is useful for issuing an annuity contract. The nature of the information that is useful in issuing an annuity contract may vary depending on the type of annuity that is being considering by the individual. Such information may generally be classified as personal information, or information regarding variables associated with the annuity or any available annuity options. Thus, the step of obtaining information, may include a plurality of steps, such as obtaining personal information 104, obtaining selected or specified annuity variables 106, and obtaining selected or specified annuity options 108.

The nature of personal information may also vary depending on the type of annuity, and may include information regarding an annuitant's name, age, date of birth, gender, the state or residence, etc. If the annuity includes a co-annuitant or beneficiary, the co-annuitant's and/or beneficiary's personal information may also be obtained. Some personal information may be necessary to compute certain variables associated with annuities, such as to compute the future income payments, the premium or purchase price, etc., and may therefore be required. For example, income payments for an immediate life annuity may be computed based on the annuitant's age and gender.

Information regarding annuity variables may be selected or specified by either the potential annuitant or the insurer. An insurer is used herein to denote the party offering and/or guaranteeing the annuity contract. The insurer may therefore be an insurance company, an underwriter, an employer, a private party, agents thereof, etc. Annuity variables are generally variables that may be used in computing the future income payments or the premium, e.g., the purchase price of the annuity. Annuity variables may therefore differ between different types of annuities. For immediate annuities, for instance, annuity variables may include the premium for the annuity, the desired future income payments, any applicable increases in the periodic payments over time to account for, e.g., inflation, the guarantee period, e.g., life or for a term certain, the applicable interest rate, fees, etc. The insurer will typically specify certain variables, such as the interest rate or rates and any applicable fees. For example, the annuitant may specify or select a premium or purchase price for an immediate annuity of $40,000 that will provide level monthly future income payments for the life of the annuitant at a rate and fees specified by the insurer. Variables for deferred annuities may further include information regarding the date the annuity matures. In the above example, the potential annuitant may further select the maturity date as the date the annuitant reaches the age of 65, which allows annuitants to make periodic payments or contributions that will amount to the total the price of the annuity.

Annuity options may be specified or selected by either the potential purchaser or the insurer. Annuity options are generally contractual rights conferred under the annuity contract to either party or beneficiary that allows the holder of the right to demand performance or non-performance from one or all of the remaining parties or beneficiaries to the contract. Annuity options, for instance, may be optional features or riders that modify a standard annuity, in which case the annuitant will be able to select from one or more available annuity options. Alternatively, certain annuity options may be standard features of the annuity contract, which will be specified by the insurer. Since annuities are contracts, annuity options may vary in nature and scope limited only by the scope of human ingenuity.

In one embodiment, the annuity contract includes at least one liquidity option that allows the holder of the option, generally the owner of the annuity which may or may be the annuitant, and/or the beneficiaries of the annuity, to convert a portion of the value of the annuity computed at least in part based on the value of future income payments, which may be lifetime dependent, into a liquid asset, such as cash. The value of the future income payments generally takes into account the value of the annuity with respect to the expected amount of the future income payments for the guarantee period, which may include the lifetime of the annuitant or annuitants. The liquidity option may further allow the owner and/or beneficiary to retain the right to future income payments after the liquid option has been exercised for any remainder of the period over which payments are guaranteed to be made, which may include the lifetime of the annuitant or annuitants. The conversion may occur before and/or after the owner elects to begin receiving annuity payments and may be in the form of advanced future income payments or a lump sum distribution of a portion of the value of the annuity.

With regard to the advanced future income payment embodiment, a holder of the right to exercise the option may demand from the insurer an advance of future income payments or a portion thereof. Although the number of times the advanced payment option may be exercised and the magnitude of the advance may be unlimited, an insurer may limit the holder's rights in this respect. For instance, the insurer may limit the number of times the option may be exercised, such as once, twice, etc., and may limit the amount of the advance in terms of a dollar amount, an income period, e.g., six months of income, or a plurality of future income payments, e.g., five or six monthly future income payments. The insurer may further limit the right to exercise the option until after the annuity payments have begun.

In one embodiment, after the advance is distributed, subsequent future income payments will not be distributed for a period of time to account for the advance. Thus, for example, an advance of six monthly future income payments may cause the future income payments to cease for the six months for which the advance was taken. Conceptually, the advance may be viewed as a lump sum distribution of six months worth of future income payments in which instance the advance will be of five future income payments and consequently future income payments will cease for a period of five months to account for the distribution. The insurer faces a risk associated with the advance in the event the insured dies before the advance is accounted for, which may be offset with a fee or other measure. In one embodiment, the risk is born solely by the insurer without a corresponding transfer of the risk to the annuitant in terms of higher fees or costs above a basic annuity without the option. In another embodiment, the right to exercise the option is not contingent on collateral circumstances, such as illness, catastrophic events, etc., and may be freely be exercised by the holder subject to any numerical limitations on the number and magnitude of the advance set forth in the annuity.

With regard to the lump sum distribution of the value of the annuity embodiment, a holder of the right may demand a portion of a commuted value of the annuity measured based at least partially on the present value at the time of the conversion of future income payments for the remainder of the guarantee period, such as for the term certain, e.g., 5, 10, 15, etc. years, or for the life expectancies of the annuitants and/or beneficiaries. Thus, the owner may demand a lump sum distribution commensurate with the value of the future income payments for the duration of the guarantee period, which may include the lifetime of the annuitant or annuitants. The scope of the demand under this option may also be limited by the insurer. The insurer, for instance, may limit the number of times the right may be exercised, such as once, twice, etc., and may limit the right to exercise the option except at certain times during the term of the annuity, such as at the fifth, tenth, and fifteenth anniversaries of a predefined date, such as the date of the commencement of income payments, or upon a showing of the occurrence of certain predefined events, such as fire, flood, illness, etc. The insured may further limit the magnitude of the demand in terms of a dollar amount, a percentage of the commuted value of the annuity, such as 20%, 30%, 40%, 50%, etc. In one embodiment, upon distribution of the payment under this option, future income payments will be adjusted to account for any distribution. A fee or a surcharge may account for the risk associated with this lump sum distribution liquidity option to the insurer, assessed in connection with the lump sum distribution or reflected in the price of the annuity.

In another embodiment, a liquid legacy benefit option is available that may be selected or specified by the potential owner or purchaser that provides a lump sum distribution to a beneficiary upon the death of the annuitant or annuitants that is substantially certain at the inception of the annuity contract. In another embodiment, the liquid legacy benefit option, which provides a lump sum distribution to a beneficiary, is permanent or does not expire at any time during the term of the annuity. The lump sum distribution may be specified in terms of a dollar amount, a percentage of the price of the annuity, a number of future income payments, etc. For example, the potential annuitant may specify a lump sum distribution that is 25% or 50% of the premium or purchase price of the annuity. Thus, the beneficiary of an annuity having a premium of $40,000 and a liquid death benefit of 25% will receive a lump sum distribution upon the passing of the annuitant of $10,000. A liquid death benefit option may be accounted for, for example, by computing future income payments based at least in part on the liquid legacy benefit option, which generally tends to reduce the future income payments otherwise due the annuitant upon the election to receive annuity income payments.

The information that is useful for issuing an annuity contract may be obtained by any one of a variety of methods. A purchaser of the annuity, for example, may give the information in person to a broker or an agent acting on behalf of the insurer who will use the information to compute a price for the annuity or compute estimated future income payment amounts based at least partially on the information obtained. Alternatively or in addition, the potential purchaser may relay the information to a remote agent, broker, or insurer with automated means, such as with personal computer or other device capable of communicating the information to the respective party for processing. Potential purchasers, for example, may communicate the relevant information via email or other forms of text messaging, or via an insurers World Wide Web site which will provide an interface for potential annuitants to communicate specific information to the insurer.

After the information is obtained from the potential purchaser and/or procured by the insurer, a premium for a specified or desired future income payment, or the future income payments for a specified or desired premium, may then be computed based at least partially on the information obtained. Additionally, for a deferred annuity, the periodic contribution necessary to total the premium may also be computed. The premium or the future income payments may be computed using standard equations and/or actuarial data known in the art with regard to annuities. Computation may be performed with a variety of manual and/or automated means. In one embodiment, the monthly future income payments for a life annuity having the lump sum death benefit option is computed with the following algorithm:

$$B = \frac{(\text{Premium} \times (1-T) - F) - (k \times \text{Premium} \times A_x)}{a_x}$$

where:
B=monthly future income payment at issue
T=premium tax (if applicable)
F=policy fee
k=lump sum reduction factor
x=issue age (in years)
$A_x$=net single premium per unit of death benefit for issue age x
$a_x$=present value of a life annuity for issue age x The lump sum reduction factor, k, is a ratio based on the percentage of the premium that may be distributed as to a beneficiary. In one embodiment, k is equal to 0.25 for a 25% lump sum death benefit and 0.55 for a 50% lump sum death benefit. The values for the net single premium per unit of death benefit for issue age x, $A_x$, and the present value of a life annuity for issue age x, $a_x$, may further be computed with the following algorithms:

$$A_x = \sum_{t=0}^{(115-x) \times 12} ({}_t p_x \times q_{x+t} \times v^t)$$

$$a_x = \sum_{t=0}^{(115-x) \times 12} (v^t \times {}_t p_x)$$

$$_n p_x = \prod_{t=0}^{n} p_{x+t}$$

where:
t=time measured in months since issue
${}_t p_x$=probability person age x survives to time t
$q_{x+t}$=probability person age x+t does not survive one month
$p_{x+t}$=probability person age x+t survives one month $$v = \frac{1}{(1+i)^{1/12}}$$

i=interest rate

The computed premium and/or the future income payments may then be presented to the user in the form of an offer to purchase the annuity, step 112. If at step 114 the individual does not accept the offer to purchase the annuity, the information obtained is either saved, such as on the computer system described below, for future reference or discarded, and the methods described above can be repeated for the next potential purchaser. If the individual to whom the offer was made accepts the offer, the annuity will issue at the computed or specified premium or purchase price, step 116. The steps required to issue an annuity vary depending on the nature of the individual that obtained the information. For example, where the insurer or a party authorized to act on behalf of the insurer obtained the information, the annuity will issue automatically or at some predetermined time thereafter, e.g., 30 days, etc. If however the individual is an insurance agent with limited authority to bind the insurer, the annuity will issue only after first being reviewed and accepted by the insurer. Similarly, conditions can be imposed by the insurer, such as a physical, etc., that must be satisfied before the annuity issues. In any event, if the annuity issues, the information obtained, such as the personal information, annuity variables, and annuity adoptions, and any other relevant information are stored in an appropriate database, step 118, such as an annuitant database.

Figure 2:
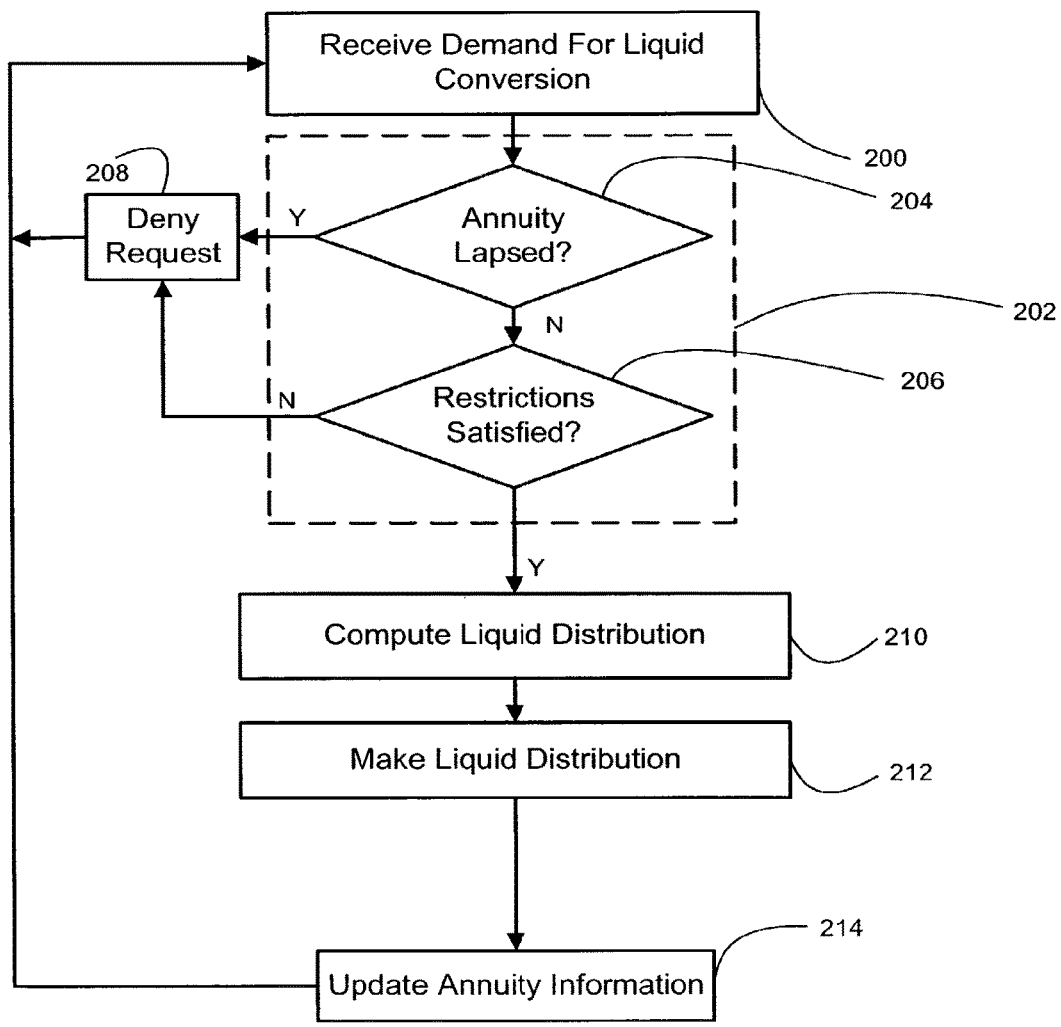
FIG. 2 is a flowchart of a method of facilitating distribution of annuity payments in accordance with at least one liquidity option according to one embodiment of this invention.

Referring to FIG. 2, a method of facilitating distribution of annuity payments in accordance with at least one liquidity option begins, in one embodiment, at step 200 with receiving a demand exercising at least one liquidity option of an annuity contract. The demand may be received from the holder of the right under the annuity contract in a variety of ways, including a hard copy demand or an electronic version thereof. The demand will then be tested at step 202 with the limitations set forth in the annuity for which the demand is being exercised, and any corresponding information related thereto. Testing the demand 202 generally denotes determining whether or not to allow the demanding party to convert at least a portion of the value of an annuity into a liquid asset, such as cash.

In one embodiment, testing includes determining whether or not the annuity is in effect or has otherwise lapsed, step 204. In another embodiment, testing includes determining whether or not any limitation or restriction that must be satisfied prior to any distribution is satisfied, step 206. Testing will vary depending on the type of the liquidity option, e.g., the conversion, being exercised. The conversion, as explained above, may be in the form of advanced payments, a lump sum distribution of a portion of the value of the annuity, or a lump sum death benefit.

Thus, where the demand is made for an advance of future payments, testing will entail determining whether the option was previously exercised and whether the current demand in combination with any previous demands fall within the maximum number of times the option may be exercised. For example, if the annuity limits the option to being used once, testing entails determining if the option has been previously exercised. Testing may further entail determining whether the amount of the demand falls within the maximum amount set forth in the annuity contract. If the maximum amount of the advance is five or six monthly future income payments, testing entails determining whether the demand is greater than five or six monthly future income payments, respectively. Additionally, if the option is limited to being exercised after the annuity payments begin for the demanding party, testing will entail determining whether the owner or beneficiary is entitled to receive income payments.

Where the demand is for a lump sum distribution of some or all of the value of the annuity, testing will similarly entail determining if the restrictions set forth in the annuity have been satisfied. Thus, testing may entail determining whether the option was previously exercised, the demand is timely, e.g., such as at about the fifth, tenth, and fifteenth anniversaries of a predefined date, such as income commencement date, or a defined window of opportunity based thereon, whether the demand is made in connection with a predefined event, such as those associated with catastrophic events including fire, flood, illness, etc., or whether the demand is within the maximum amount set forth in the annuity contract. Where the demand is for a lump sum death benefit, testing will entail determining whether the guarantee period for the annuitant has lapsed, e.g., the annuitant died, and whether there was any previous lump sum benefit distribution.

If at steps 202, 204, or 208 the demand fails with regard to the limitations or restrictions set forth in the annuity contract, the demand will be denied, step 208, and the above steps may be repeated for the next or subsequent demands. If the demand passes the testing criteria, the amount of liquid distribution may then be computed, step 210. Computing the liquid distribution will vary in accordance with the type of liquidity option for which the demand is being made. If the demand is for an advance of future income payments, the liquid distribution will be computed in accordance with the demand for the advance, such as the demand for a particular a dollar amount, an income period, e.g., six months of income (advance of five months of future income payments), or a plurality of future income payments, e.g., six monthly future income payments. In one embodiment, advances will not be discounted to reflect a loss based on the time value of money. Thus, an advance of six monthly future income payments of $300 will be $1,800. Alternatively, the advance will reflect the present value of the advanced future income payments at the time of the advance, thereby accounting for the loss based on the time value of money.

If the demand is for a lump sum distribution based on the commuted value of the annuity, the commuted value will be computed based at least partially on future income payments for the remainder of the guarantee period, such as for the term certain, e.g., 5, 10, 15, etc. years, or for the life expectancies of the annuitants and/or beneficiaries, or a portion thereof, such as 10%, 20%, 30%, etc. of the commuted value. In one embodiment, the amount of the demand for the lump sum distribution will be limited only to 30% of the commuted value, thus 30% of the commuted value will in this instance be computed. For a life annuity, the commuted value will therefore be based at least partially on the life expectancy of the annuitants. In one embodiment, the commuted value of a single life annuity, is computed with the following algorithm:

$$WD_g = .3 \times \sum_{t=1}^{max(l-g, e_x-g)} B_{(g+t)} \times v_{wd(g+t)}$$

where:
  $WD_g$=commuted value at time g g=number of months between income start date and withdrawal date t=time measured in months since withdrawal date $B_t$=monthly benefit at time t for an annuity starting with an initial benefit of $1.00

$$e_x = \sum_{t=1}^{\infty} {}_tp_x = \text{future life expectancy at issue for person age } x \text{ (in months)}$$

x=issue age of primary annuitant (in months)

$$v_{wd(t)} = (1+i_{(g+t)}+0.01+\text{IRCA})^{-(t/12)} \text{ for } (g+t)<361$$

$$v_{wd(t)} = (1+i_{360}+0.01+\text{IRCA})^{-(360-g/12)} \times (1.055+\text{IRCA})^{-(g+t-360)/12} \text{ for } (g+t)>360$$

$i_t$=interest rate applicable t months after issue $$\text{IRCA}_g = 1.00 \times (\text{CMT}_{(g)} - \text{CMT}_0) \text{ if } \text{CMT}_g < \text{CMT}_0$$

$$\text{IRCA}_g = 1.25 \times (\text{CMT}_{(g)} - \text{CMT}_0) \text{ if } \text{CMT}_g > \text{CMT}_0$$

$\text{CMT}_g$=10 year Constant Maturity Treasury yield g months after issue ${}_tp_x$=probability annuitant issued at age x survives t months after issue Similarly, the commuted value of a life annuity for joint life annuitants may be computed with the following algorithms:

If both annuitants are alive:

$$WD_g = .3 \times \sum_{t=1}^{max(l-g, e_{xy(bar)}-g)} B_{(g+t)} \times v_{wd(g+t)}$$

If only annuitant x is alive:

$$WD_g = .3 \times \sum_{t=1}^{max(l-g, e_x-g)} B_{(g+t)} \times v_{wd(g+t)}$$

If only annuitant y is alive:

$$WD_g = .3 \times \sum_{t=1}^{max(l-g, e_y-g)} B_{(g+t)} \times v_{wd(g+t)}$$

where:

y=issue age of joint annuitant (in months)

${}_tp_y$=probability annuitant issued at age y survives t months after issue $$e_y = \sum_{t=1}^{\infty} {}_tp_y = \text{future life expectancy at issue for person age } y \text{ (in months)}$$

$$e_{xy} = \sum_{t=1}^{\infty} {}_tp_{xy} =$$

Joint status life expectancy at issue (fails upon first death)(in months)

where:

$${}_tp_{xy} = {}_tp_x \times {}_tp_y$$

$e_{xy(bar)}$=Second to die status life expectancy at issue (fails on second death) (in months)

If no primary annuitant specified: let $e_{xy(bar)} = (k \times e_x) + (k \times e_y) + [(1-2k) \times e_{xy}]$ If primary annuitant specified: let $e_{xy(bar)} = e_x + (k \times e_y) - (k \times e_{xy})$ Where:

k=proportion of initial benefit that is paid upon 1st death. For example, if the benefit is scheduled to reduce from $100 to $70, then k=0.7.

In one embodiment, the commuted value for a single life annuity is computed with the following algorithms:

if g≥l (WD is after certain period)

$$X = \sum_{t=1}^{360-g} B_{(g+t)} \times v_{wd(g+t)}^t \times {}_{(g+t)}p_x$$

$$Y = \sum_{t=361-g}^{\infty} B_{(g+t)} \times v_{wd(g+t)} \times {}_{(g+t)}p_x$$

$$WD_g = .3 \times (X + Y)$$

if g<l (within certain period)

$$X = \sum_{t=1}^{l-g} B_{(g+t)} \times v_{wd(g+t)}^t$$

$$Y = \sum_{t=l-g+1}^{360-(l-g)} (B_{(l-g+t)} \times v_{wd(l-g+t)}^t \times {}_{(l-g+t)}p_x)$$

$$Z = \sum_{t=361-(l-g)}^{\infty} (B_{(l-g+t)} \times v_{wd(l-g+t)} \times {}_{(l-g+t)}p_x)$$

$$WD_g = .3 \times (X + Y + Z)$$

In one embodiment, the commuted value for a joint life annuity is computed with the following algorithms:

if the primary annuitant is selected:

$$WD_g = 0.3 \times [a + (k \times b) - (k \times c)]$$

if the primary annuitant is not selected:

$$WD_g = 0.3 \times [(k \times a) + (k \times b) + ((1-2k) \times c)]$$

if g≥l (WD is after certain period)

$a = (X_1 + Y_1)$, where $$X_1 = \sum_{t=1}^{360-g} B_{(g+t)} \times v_{wd(g+t)}^t \times {}_{(g+t)}p_x$$

$$Y_1 = \sum_{t=361-g}^{\infty} B_{(g+t)} \times v_{wd(g+t)} \times {}_{(g+t)}p_x$$

$b = (X_2 + Y_2)$, where $$X_2 = \sum_{t=1}^{360-g} B_{(g+t)} \times v_{wd(g+t)}^t \times {}_{(g+t)}p_y$$

$$Y_2 = \sum_{t=361-g}^{\infty} B_{(g+t)} \times v_{wd(g+t)} \times {}_{(g+t)}p_y$$

-continued $$c = (X_3 + Y_3), \text{ where}$$

$$X_3 = \sum_{t=1}^{360-g} B_{(g+t)} \times v^t_{wd(g+t)} \times {}_{(g+t)}p_{xy}$$

$$Y_3 = \sum_{t=361-g}^{\infty} B_{(g+t)} \times v_{wd(g+t)} \times {}_{(g+t)}p_{xy}$$

The liquid distribution may then be made at step 212 in accordance with the annuity contract, e.g., the liquidity option elected. The distribution of the liquid asset may be made in a variety of ways as well, such as in the form of a cash value, which includes actual cash, payment by check, wire transfer, etc. The annuity information may then be updated, step 214, to reflect and/or account for the distribution. As noted above, where the distribution is in the form of an advance, subsequent future income payments may not be distributed for the time period for which the advance was taken. Thus, for example, an advance of six monthly future income payments may cause the future income payments to cease for the six months for which the advance was taken. Where the distribution is in the form of a lump sum distribution of the value of the annuity, subsequent future income payments may instead be reduced to reflect the distribution. Finally, where the distribution is a lump sum legacy benefit, the annuity information will be updated accordingly to reflect the distribution. The above steps may then be repeated for subsequent demands to convert at least a portion of the value of the annuity into a liquid asset.

Figure 3:
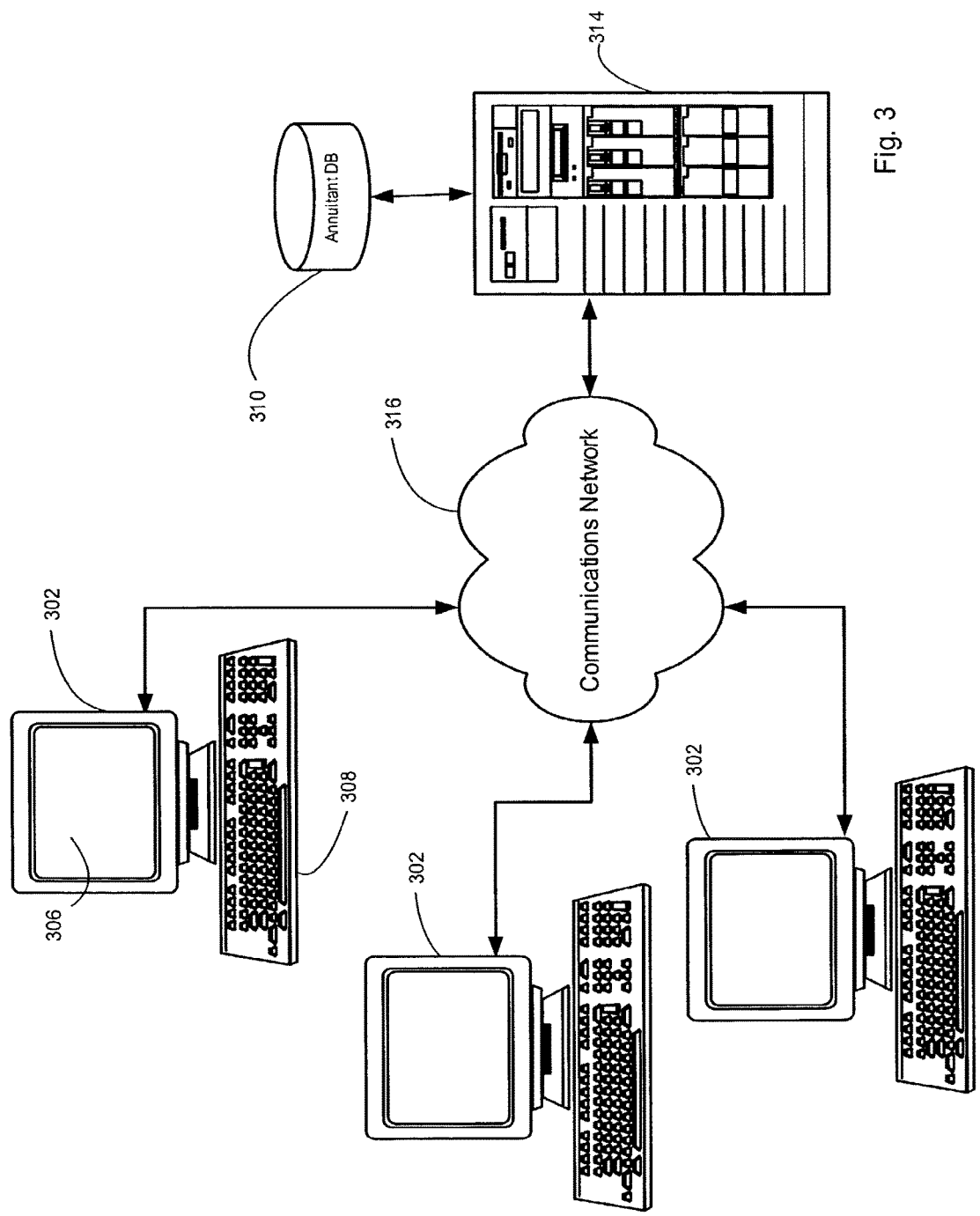
FIG. 3 is a diagram of a system useful for providing an annuity which includes at least one liquidity option according to one embodiment of this invention.

Referring to FIG. 3, a system useful in providing an annuity with liquidity options according to one embodiment of this invention includes a client interface 302 having a processor and associated computer memory, a display device 306, and an input device 308. The client interface 302 is at least one of a programmable calculator, or a personal computer or special purpose computer having appropriate software or otherwise designed to compute or assist in computing first insurance premiums, subsequent insurance premiums, etc., according to the methods described herein. The software may be installed locally at the client interface 102, thereby enabling a user, such a broker, agent, or potential annuitant, to input information obtained regarding the annuity contract, and to compute or assist in computing a premium for the annuity given a selected or specified future income payments or future income payments given a selected or specified purchase price or premium. The software may be proprietary software designed to provide the methods described herein or, alternatively, commonly available software, such as spreadsheet or a database programs, adopted to perform the same.

In an alternative embodiment, the client interface 302 is communicatively connected to at least one server 314 over a communications network 316, such as a local area network (LAN), a wide area network (WAN), the Internet, the World Wide Web (WWW), a wireless network, or a combination thereof. The server 314 includes at least one database, such as an annuitant database 310. The annuitant database 310 generally includes information obtained that is useful for issuing and providing an annuity contract, such as personal information, annuity variables, annuity options, etc.

In one embodiment, the client interface 302 accesses the relevant database or databases, stored locally at the client interface 302 or remotely at the server 314, for information necessary to compute or otherwise determining the premium or price of the annuity contract or the future income payments, and may update the relevant databases accordingly. Similarly, the client interface 302 accesses the annuitant database to compute the liquid distribution, e.g., the advance payment, the lump sum distribution, etc.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

The invention claimed is:

1. A computerized method of providing an annuity having a guarantee period for the life of an annuitant and an advanced payment option comprising:
   obtaining, by a processing device via a web communication interface, annuitant information useful for issuing the annuity;
   electronically computing, by the processing device via a digital assistant interface, an annuity variable including future income payments, the annuity variable computed based at least partially on the annuitant information;
   generating, by the processing device via the digital assistant interface, a programming loop that tests demands to exercise the advanced payment option with conditional programming associated with the annuity;
   computing, by the processing device via the digital assistant interface, a commuted value, at a time of exercising the advanced payment option, of the future income payments for a remainder of the guarantee period based on the annuity variable;
   wherein the digital assistant interface receives an indication from the programming loop to facilitate the computation of the commuted value for advanced distribution of the future income payments to the annuitant, the advanced distribution of the future income payments comprising a lump sum distribution of a portion of the commuted value; and
   wherein the future income payments due to the annuitant for the remainder of the guarantee period subsequent to receiving the advanced distribution of the future income payments are at least one of ceased and reduced for a period of time to account for the advanced distribution of the future income payments.

2. The method of claim 1, wherein the advanced distribution comprises an advance of six months of the future income payments.

3. The method of claim 1, wherein the advanced distribution of the future income payments is based at least in part on a present value of the annuity at the time of exercising a right to advanced distribution for the remainder of the guarantee period.

4. The method of claim 1, wherein the advanced payment option is limited to a number of times the right to advanced distribution may be exercised.

5. The method of claim 1, wherein the advanced distribution of the future income payments is limited to a commuted value of the annuity.

6. The method of claim 1, wherein the annuity comprises a liquidity option that allows a holder of the liquidity option to convert a portion of the value of the annuity into a liquid asset based at least in part on an expected value of the future income payments.

7. The method of claim 6, wherein the liquidity option allows the holder of the liquidity option to retain a right to future income payments after the liquid option has been exercised for remainder of the guarantee period.

8. A computerized method of facilitating distribution of annuity payments comprising:
receiving, by a processing device via a web communication interface, a demand for an advanced distribution of future income payments;
electronically computing, by the processing device via a digital assistant interface, the advanced distribution according to at least one advanced payment option of an annuity having a guarantee period for the life of an annuitant, wherein:
wherein the digital assistant interface receives an indication from a programming loop including conditional programming that tests the demand with conditional programming associated with the annuity to facilitate the computation of the advanced distribution of the future income payments, the advanced distribution of the future income payments comprising an advance of a portion of a commuted value of the future income payments for a remainder of the guarantee period exceeding the value of a plurality of monthly future income payments; and
wherein the future income payments due to the annuitant for the remainder of the guarantee period subsequent to receiving the advanced distribution of the future income payments are at least one of ceased and reduced for a period of time to account for the advanced distribution of the future income payments.

9. The method of claim 8, wherein the advanced distribution of future income payments comprises an advance of six months of the future income payments.

10. The method of claim 8, wherein the ceasing of subsequent future income payments is for six months.

11. The method of claim 8, wherein the ceasing of subsequent future income payments is for five months.

12. A computerized system for providing an annuity having a guarantee period for the life of an annuitant and an advanced payment option, the system comprising at least one server computer coupled to at least one client interface over a communication network, the at least one server computer operable at least to:
obtain from at least one client device, via a web communication interface, annuitant information useful for issuing the annuity;
compute, by executing an assistant interface, an annuity variable including future income payments, the annuity variable computed based at least partially on the annuitant information,
generate, by the assistant interface, a programming loop that tests demands to exercise the advanced payment option with conditional programming associated with the annuity,
compute, by the assistant interface, a commuted value, at a time of exercising the advanced payment option, of the future income payments for a remainder of the guarantee period based on the annuity variable,
wherein the assistant interface receives an indication from the programming loop to facilitate the computation of the commuted value for advanced distribution of the future income payments to the annuitant, the advanced distribution of the future income payments comprising a lump sum distribution of a portion of the commuted value;
issue the annuity with the advanced payment option;
determine, by the assistant interface, the advanced distribution in response to a demand for the advanced distribution; and
modifying the future income payments by at least one of ceasing and reducing the future income payments due to the annuitant for the remainder of the guarantee period subsequent to receiving the advanced distribution of the future income payments for a period of time to account for the advanced distribution of the future income payments.

13. The system of claim 12, wherein the advanced distribution comprises an advance of six months of the future income payments.

14. The system of claim 12, wherein the advanced distribution of the future income payments is based at least in part on a present value of the annuity at the time of exercising the right to advanced distribution for the remainder of the guarantee period.

15. The system of claim 12, wherein the advanced payment option is limited to a number of times the advanced distribution right may be exercised.

16. The system of claim 12, wherein the advanced distribution of the future income payments is limited to a commuted value of the annuity.

17. The system of claim 12, wherein the annuity comprises a liquidity option that allows a holder of the liquidity option to convert a portion of the value of the annuity into a liquid asset based at least in part on an expected value of the future income payments.

18. The system of claim 17, wherein the liquidity option allows the holder of the liquidity option to retain a right to future income payments after the liquid option has been exercised for the remainder of the guarantee period.

* * * * *